United States Patent [19]

Malz

[11] Patent Number: 5,369,890
[45] Date of Patent: Dec. 6, 1994

[54] SELF-POSITIONING CALIPER

[76] Inventor: Reuben Malz, 16A Drouin Street, Dollard-des-Ormeaux, Quebec, Canada, H9A 2H1

[21] Appl. No.: 70,187

[22] Filed: Jun. 2, 1993

[51] Int. Cl.⁵ .......................... G01B 5/02; G01B 3/20; G01B 7/02
[52] U.S. Cl. ........................................ 33/810; 33/802
[58] Field of Search ................ 33/810, 783, 784, 791, 33/792, 793, 802, 803, 806, 811

[56] References Cited

U.S. PATENT DOCUMENTS

| | | | |
|---|---|---|---|
| 1,129,705 | 2/1915 | Messier | 33/810 |
| 2,085,082 | 6/1937 | Delany | 100/31 |
| 2,183,169 | 12/1939 | Prentice | 29/148 |
| 2,307,945 | 1/1943 | Palik | 33/802 |
| 2,356,936 | 8/1944 | Krause . | |
| 2,575,899 | 11/1951 | Vining et al. | 100/31 |
| 2,599,427 | 6/1952 | Bellingher | 100/31 |
| 2,694,262 | 11/1954 | Daniel | 33/810 |
| 2,914,643 | 11/1959 | Fields et al. | 219/19 |
| 2,915,003 | 12/1959 | Crosby et al. | 100/26 |
| 2,915,004 | 12/1959 | Leslie | 100/26 |
| 3,088,397 | 5/1963 | Martin et al. | 100/26 |
| 3,213,541 | 10/1965 | Raffman | 33/810 |
| 3,921,799 | 11/1975 | Meler | 206/83.5 |
| 3,949,450 | 4/1976 | Bailey | 24/27 |
| 4,070,733 | 1/1978 | Simich | 24/27 |
| 4,156,385 | 5/1979 | Lems et al. | 100/3 |
| 4,226,007 | 10/1980 | Duenser | 24/20 EE |
| 4,228,565 | 10/1980 | Lens et al. | 24/20 EE |
| 4,466,535 | 8/1984 | Huson | 206/83.5 |
| 4,501,356 | 2/1985 | Urban et al. | 206/83.5 |
| 4,599,800 | 7/1986 | Wyrwich et al. | 33/802 |
| 4,741,108 | 5/1988 | Cohen | 33/810 |
| 4,873,771 | 10/1989 | Wüst | 33/802 |
| 5,208,997 | 5/1993 | Tas | 33/783 |
| 5,253,431 | 10/1993 | Smith | 33/784 |

FOREIGN PATENT DOCUMENTS 26133 of 1898 United Kingdom .

Primary Examiner—Christopher W. Fulton
Attorney, Agent, or Firm—Keck, Mahin & Cate

[57] ABSTRACT

A self-positioning caliper is provided having an elongated base adapted to rest on a flat horizontal surface; a stationary jaw and a movable jaw projecting upwardly from the elongated base, the movable jaw being held by tension, for example gravity, against the stationary jaw. When the object to be measured is inserted between these jaws via a V-shaped recess provided at the upper end thereof it pushes the movable jaw away from the stationary jaw by the distance which is measured by an electronic measuring unit mounted to move with the movable jaw by the same distance and to measure the same and display the measurement. The caliper may also include side plates allowing measurement of the length or height of an object which is not readily measurable by the caliper's jaws.

12 Claims, 4 Drawing Sheets

SELF-POSITIONING CALIPER

BACKGROUND OF THE INVENTION

1. Field of the Invention

This invention relates to a novel caliper. More particularly, the invention relates to a self-positioning caliper requiring no use of hands for positioning the same. Thus, both hands can be used to hold the object to be measured and the measurement is performed under a precise pressure.

2. Brief Description of the Prior Art

Digital vernier calipers are known in the art. They are similar to the regular vernier calipers using a measuring scale or a dial, but they use a electronic measuring unit with a digital display of measured values and with a possible interface for connection to a computer and/or printer to provide means for storing and/or printing the measurements. All these calipers are positioned for measurement by hand either by moving the measuring jaw away from and then towards the stationary jaw or by a thumbwheel jaw movement, whereby the measuring jaw can be moved with a thumb of the same hand that holds the caliper, leaving the other hand free to insert the object to be measured.

The problem with such calipers is that the measurement depends on the force exerted by the person measuring the dimension of the object; consequently when measuring, for example, the diameter of a plastic bottle or other container it is almost impossible to get accurate repetitive readings. By exerting even a slightly stronger pressure than during a preceding measurement, the plastic container will yield inwardly and the measurement reading can then easily exceed the acceptable standard in the industry of 0.007" variation. Also when different operators perform the measurements, there is even greater possibility of having erroneous readings. It should also be noted that, for example, in the plastics industry, when objects such as bottles, containers and the like, are manufactured, the plastic is not completely solidified for a period that may last up to twenty four hours and it is often important to measure the dimensions of such objects while they are still somewhat soft. Again, with known calipers this is very difficult to do, since even the slightest variation in the force exerted on the measuring jaw may greatly distort the reading.

The need of a precise measuring force is recognized, for example, in U.S. Pat. No. 4,924,598 of May 5, 1990, which discloses a height measuring instrument with a fairly complex arrangement to produce a desired measuring pressure between a measuring pin and the article to be measured. Such arrangement would not be applicable to a caliper.

Another problem with the known calipers is that they must be held in one hand while the article to be measured is held in the other hand and is then inserted between the jaws of the calliper to effect the measurement. However, if an article is such that it must be held with both hands to be measured, then the known calipers cannot be used, unless two people perform the measurement, one holing the article to be measured and the other effecting the measurement with the caliper. This, of course, would be quite inefficient.

OBJECTS AND SUMMARY OF THE INVENTION

It is an object of the present invention to provide a self-positioning caliper which obviates the above disadvantages of known calipers and permits measurements with a constant and repeatable measuring force.

A further object of the present invention is to provide a caliper that requires no use of hands to effect the measurements.

A still further object of this invention is to provide such a caliper with optional means for measuring lengths or heights which are not otherwise readily measurable by the caliper's jaws.

Other objects and advantages of the invention will be apparent from the following description.

There is provided in accordance with the present invention a caliper having an elongated base adapted to rest on a flat horizontal surface, such as a table; a stationary jaw at one end of said base projecting upwardly therefrom and having an inner edge against which an object to be measured will abut and which is perpendicular to the base; a movable jaw also projecting upwardly from the base and having a measuring edge also perpendicular to said base and normally positioned against the inner edge of the stationary jaw, said movable jaw being movable under a predetermined tension, along said base, away from said stationary jaw when the object to be measured is inserted between said jaws; the upper ends of said jaws forming a generally V-shaped recess when the jaws rest against each other to permit insertion of the object to be measured between the edges of said jaws by pushing said object into said recess; and an electronic measuring unit mounted to move with the movable jaw and to accurately measure the distance between the inner edge of the stationary jaw and the measuring edge of the movable jaw and having means to display such measurements.

The tension under which the movable jaw is moved away from the stationary jaw, when the object to be measured is inserted between said jaws, can be provided by gravity. To achieve this, the end of the elongated base, which is opposite to the end where the stationary jaw is located, is raised to such a level that the movable jaw will slide by gravity towards the stationary jaw. For this purpose the movable jaw is mounted on suitable sliding means, such as, for example, at least one ball bearing housing secured to and moving along at least one rod, preferably a steel rod. It should be noted, however, that any sliding arrangement that provides a stable support for the movable jaw and a good sliding capability would be suitable for the purpose of the present invention. Normally, the gravity pull should be just strong enough to achieve adequate sliding of the movable jaw towards the stationary jaw, but not to be too strong so as not to damage or affect in any way the article to be measured. Usually, the raised end is raised so that it is at an angle of between 15° and 30° from the horizontal, although this is by no means limitative.

The predetermined tension can also be provided by resilient means. For example, a spring or an elastic may be used to hold the movable jaw against the stationary jaw under a desired pressure. This pressure should again be such that when the object to be measured is inserted into the V-grooved recess and pushed downward between the jaws, said jaws will readily open to permit insertion of the object between the edges of the jaws, for measurement. Thus, the tension under which the movable jaw is pressed against the stationary jaw should be constant and should not be such that it may either damage or in any way affect the shape of the object to be measured.

A portion of the inner edge of the stationary jaw and the corresponding portion of the measuring edge of the movable jaw may be beveled so as to permit measurement between threads of a threaded object or within similar recesses. Usually it is the upper portion of the jaws that is so beveled.

The electronic measuring unit suitable for the purposes of the present invention is a digimatic scale unit with a digital display. Such units are known and available on the market. For example such a unit is available from Mitutoyo Company of Japan, however, the invention is by no means restricted thereto. A unit operating on the same principle is disclosed, for example, in U.S. Pat. No. 4,945,651 of Aug. 7, 1990 relating to an apparatus for measuring lengths. The unit comprises an electronic length measuring device with a digital display which displays the length of displacement of said device on a flat strip which also forms part of the unit and on which the measuring device slides from one end to the other. The unit is normally battery operated and is provided with a push button system for setting to zero in any desired position and for display in English units or in metric units, as desired. Such devices are also normally provided with an interface to connect them to a computer and/or a printer for storing or recording the measured values.

In accordance with the present invention, the flat strip can be mounted parallel to the sliding means on which the movable jaw is mounted and the measuring device travelling on said strip is solidly interconnected with the movable jaw so that when the movable jaw is moved away from the stationary jaw, the device will move by the same distance on the flat strip and will measure the length of displacement of said device, and therefore of the movable jaw, and display it on the digital display unit.

A further embodiment of the present invention provides for a combination of the novel caliper with means for measurement of lengths or heights which are not otherwise measurable by the caliper's jaws. To achieve this, there is provided: a first plate connected to the stationary jaw and projecting sideways therefrom beyond the side edge of the elongated base, said plate being stationary, perpendicular to the stationary jaw and parallel to the surface of the base and having a straight outer edge; and a second plate connected to move with the movable jaw and projecting sideways in the same direction as the first plate and also extending beyond the side edge of the elongated base, said second plate being parallel and in proximity to the first plate and having a straight inner edge; said two plates being so positioned with respect to each other as to provide length measurement of an object or part thereof, such as for example, the neck of a bottle, abutting against the edge of the second plate and pushing it away from the outer edge of the first plate by the distance to be measured. The second plate preferably has a section overlapping with the first plate so that the inner edge thereof is aligned with the outer edge of the first plate. Also, preferably, the overlapping section is positioned under the first plate and there is a downward projection provided at the inner edge of the second plate to facilitate abutment of the object to be measured.

BRIEF DESCRIPTION OF THE DRAWINGS

The invention will further be described with reference to the accompanying drawings in which.

DESCRIPTION OF THE PREFERRED EMBODIMENTS

Figure 1:
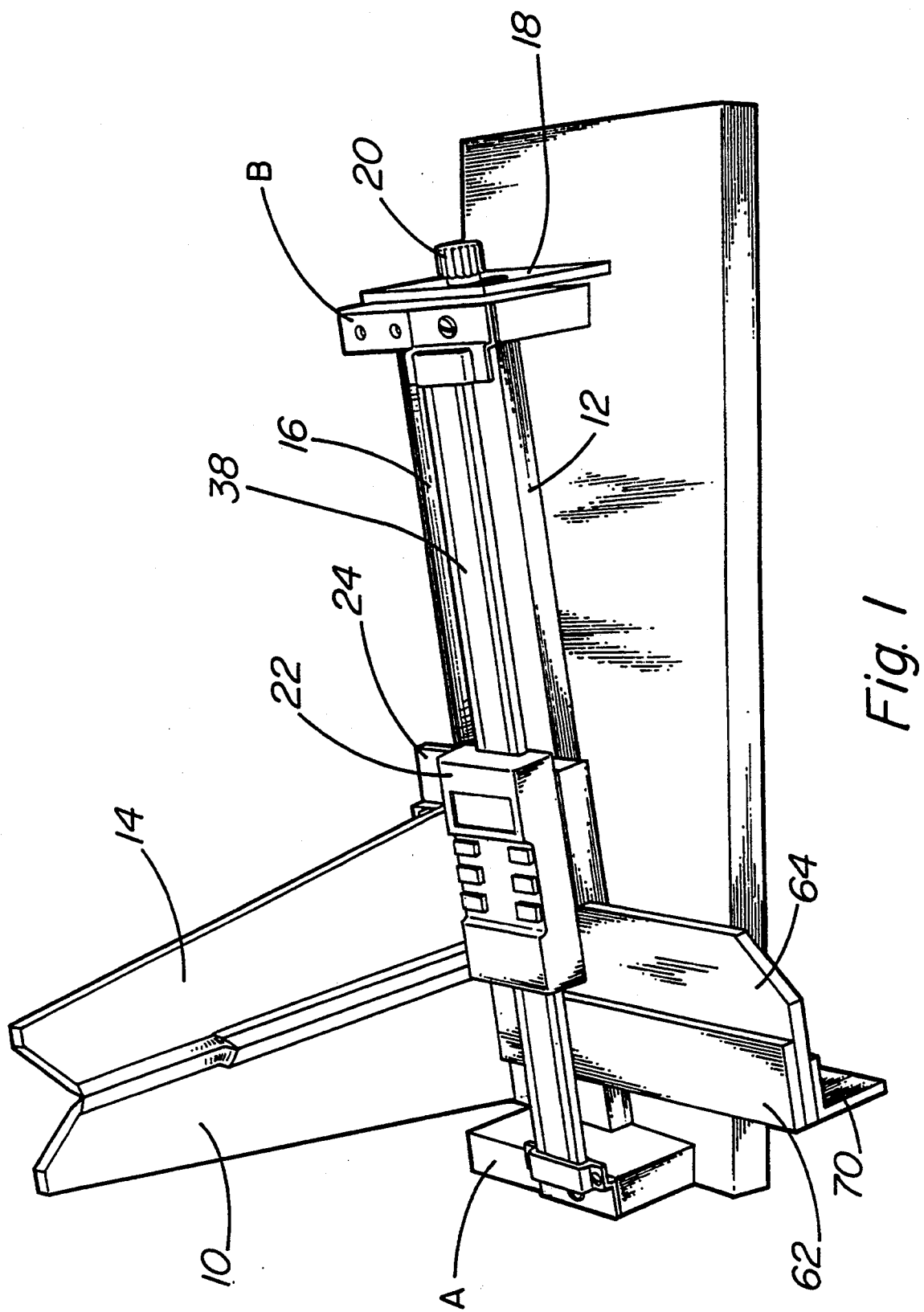
FIG. 1 is a perspective view of the caliper according to the present invention from one side thereof, with the jaws closed.

Referring to the drawings in which the same reference numbers refer to the same parts in all figures, FIG. 1 illustrates the caliper of the present invention which is positioned to operate by gravity. A stationary jaw 10 is mounted on elongated base 12 at one end (end A) thereof, projecting upwardly therefrom and being perpendicular thereto. A movable jaw 14, also projecting upwardly from the elongated base 12 and also being perpendicular thereto is, in its normal (non measuring) position, made to rest against jaw 10 under a predetermined tension produced herein by gravity because the opposite end of the elongated base (end B) is raised to a higher level than end A so that the movable jaw 14 would slide by gravity on rod 16 towards the stationary jaw 10. End B is raised by using an extension 18 which is slidably fixed thereto by means of a bolt and screw 20. The angle of incline of between 15° and 30° is normally selected by raising end B to produce the desired gravity sliding effect, without exceeding the pull or the weight of the movable jaw 14 to the point that it could adversely affect the object to be measured.

An electronic measuring unit 22 is mounted on a platform 24 on which the moving jaw 14 is also mounted. Unit 22 and jaw 14 therefore move in tandem with each other. The platform 24 sits on housings 26, 28 (see FIG. 2) provided with ball bearings and sliding along steel rod 16 which extends between end B and the bottom part of jaw 10. A second steel rod 30 is also provided parallel to rod 16 with another ball-bearing housing 32 (see FIG. 3) to make sure that the supporting platform 24 is as stable as possible. This is a preferred arrangement.

Figure 2:
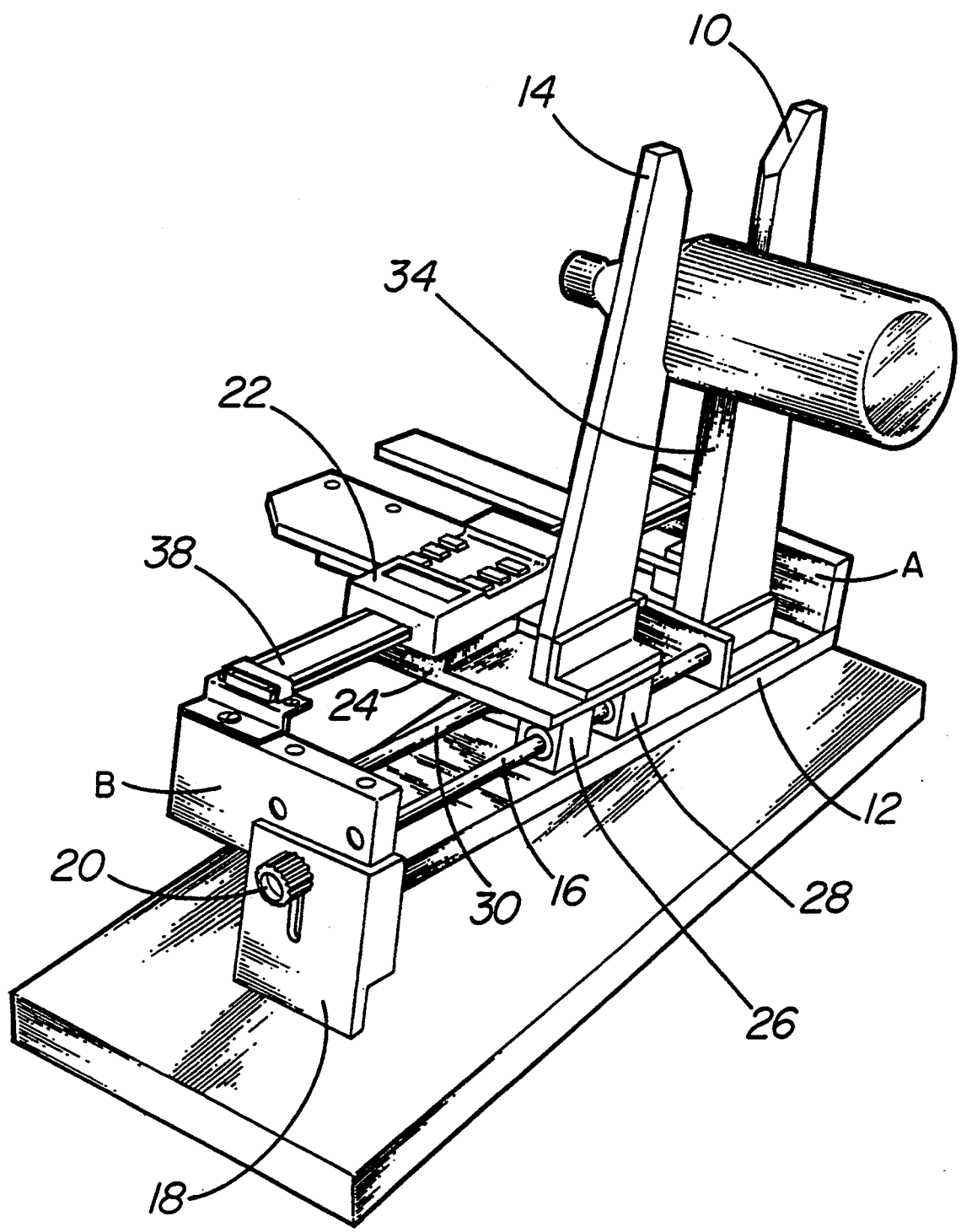
FIG. 2 is another perspective view of the caliper according to the present invention from a different angle showing measurement being made.
Figure 3:
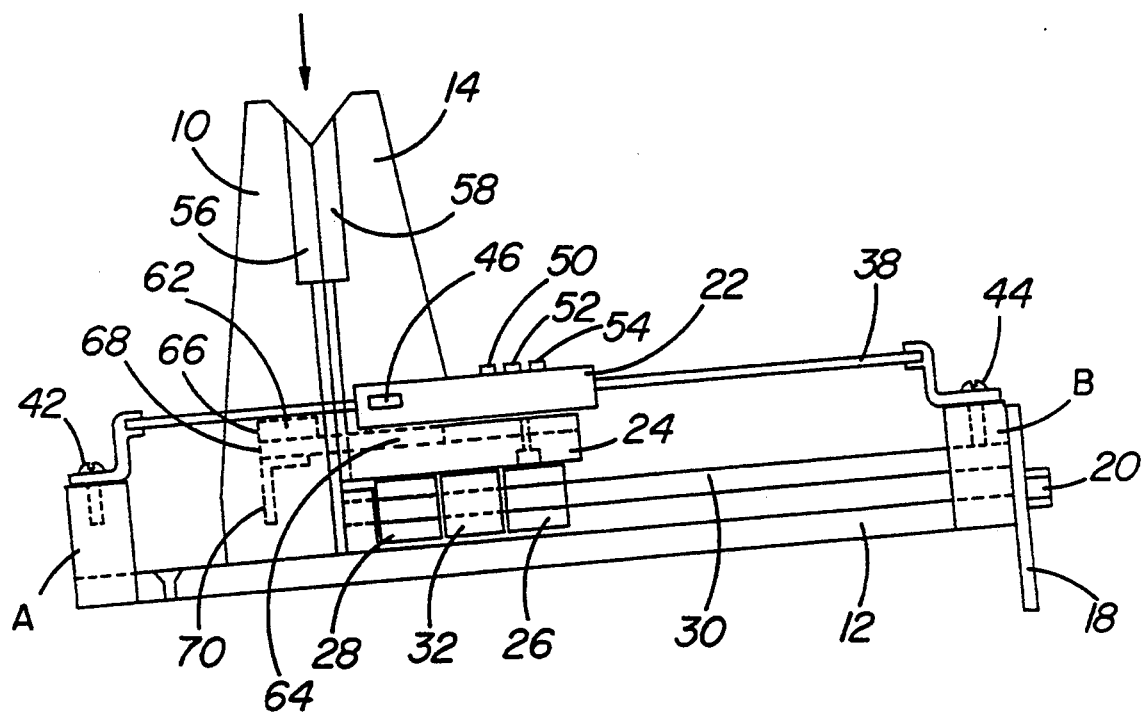
FIG. 3 is a side view of the caliper in accordance with the present invention with the jaws closed by gravity.

In FIG. 2 one can see that the inner edge 34 of the stationary jaw 10 serves to abut the object to be measured. Such object is inserted between jaws 10 and 14 via the V-shaped recess at the upper end of these jaws as shown by the arrow in FIG. 3. When the object is so inserted the measuring edge 36 (see FIG. 6) of the movable jaw 14 moves away from the stationary jaw 10 by the dimension of the object to be measured, thereby allowing accurate measurement of such dimension.

Figure 4:
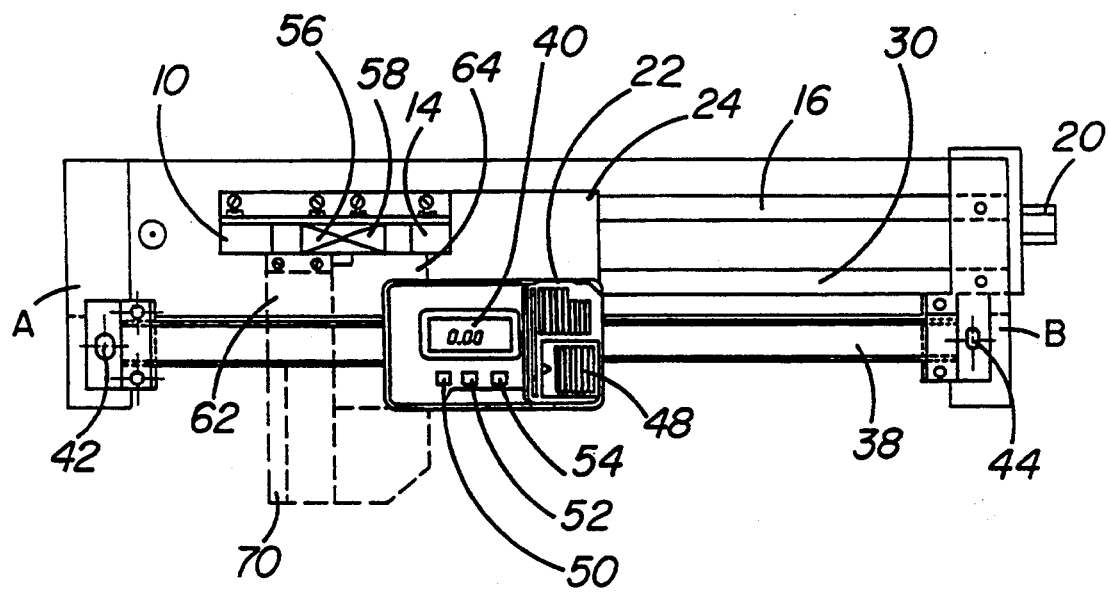
FIG. 4 is a top view of the caliper in accordance with the present invention.

The measurement is done by means of the electronic measuring unit 22 which slides in tandem with the movable jaw 14 on a flat strip 38 which allows measurement of the distance between the zero point where the jaws 10 and 14 rest against each other and a point where these jaws are separated from each other by the dimension of the object to be measured. The measurement is displayed on digital display 40 (see FIG. 4). The measuring strip 38 is connected at its ends to the ends A and B of the elongated base 12 by screws 42, 44.

This strip 38 is parallel to the base 12 and to the steel rods 16 and 30. It passes within unit 22 and allows said unit to slide thereon to effect the measurement. Such measuring units, together with the suitable strips on which they slide are available on the market as already previously mentioned. In fact, the measuring unit shown in FIGS. 1, 2 and 6 is a different model from the one shown in FIGS. 3, 4 and 5. The unit may also comprise an interface 46 (see FIG. 3) for connection thereof with a computer and/or a printer. It is normally battery operated with a Li-Cd battery being inserted at 48. It also has a number of buttons 50, 52, 54, such as on/off, reset, in/mm and the like.

It will be appreciated that the object to be measured, for example, a bottle, can be readily inserted by pushing it into the V-shaped recess (see arrow in FIG. 3) between jaws 10 and 14 to measure its diameter. Movable jaw 14 will thereby move and position itself at a distance from jaw 10 (see FIG. 2) corresponding to the object's diameter and this distance will be recorded by measuring unit 22 and displayed by digital display 40. The object can be held with both hands and moved laterally to measure the diameter throughout its entire length.

If the object is grooved, the diameter between the groves can also be measured by using the beveled upper portion of the jaws 10 and 14 shown by tapering sections 56, 58.

Figure 5:
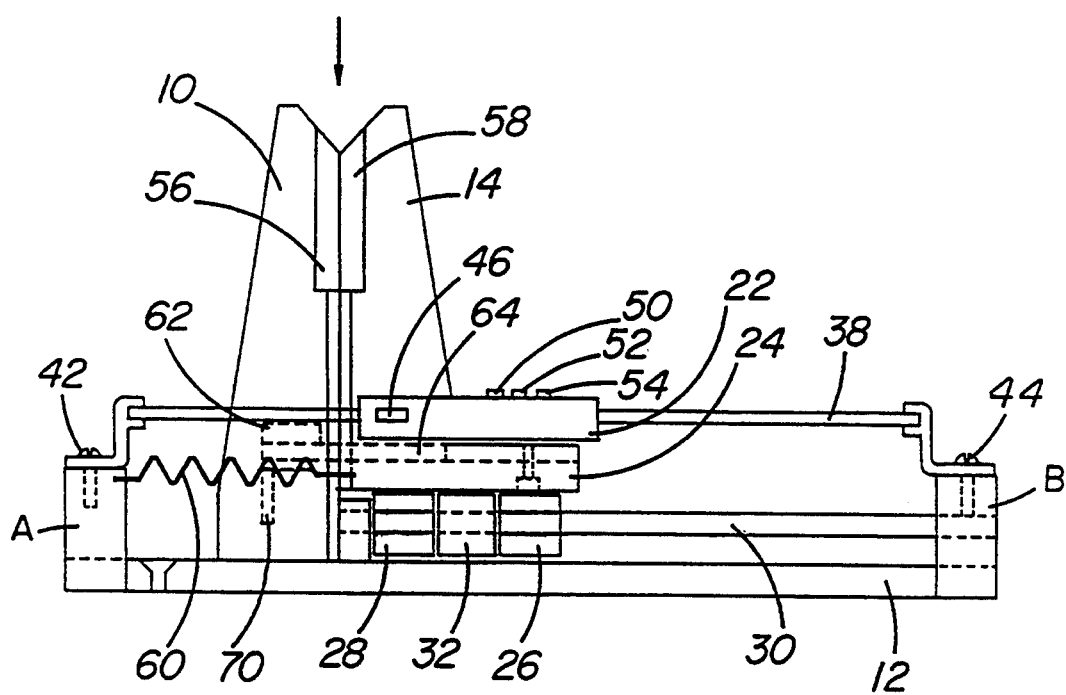
FIG. 5 is a side view of the caliper in accordance with the present invention with the jaws closed by resilient means.
Figure 6:
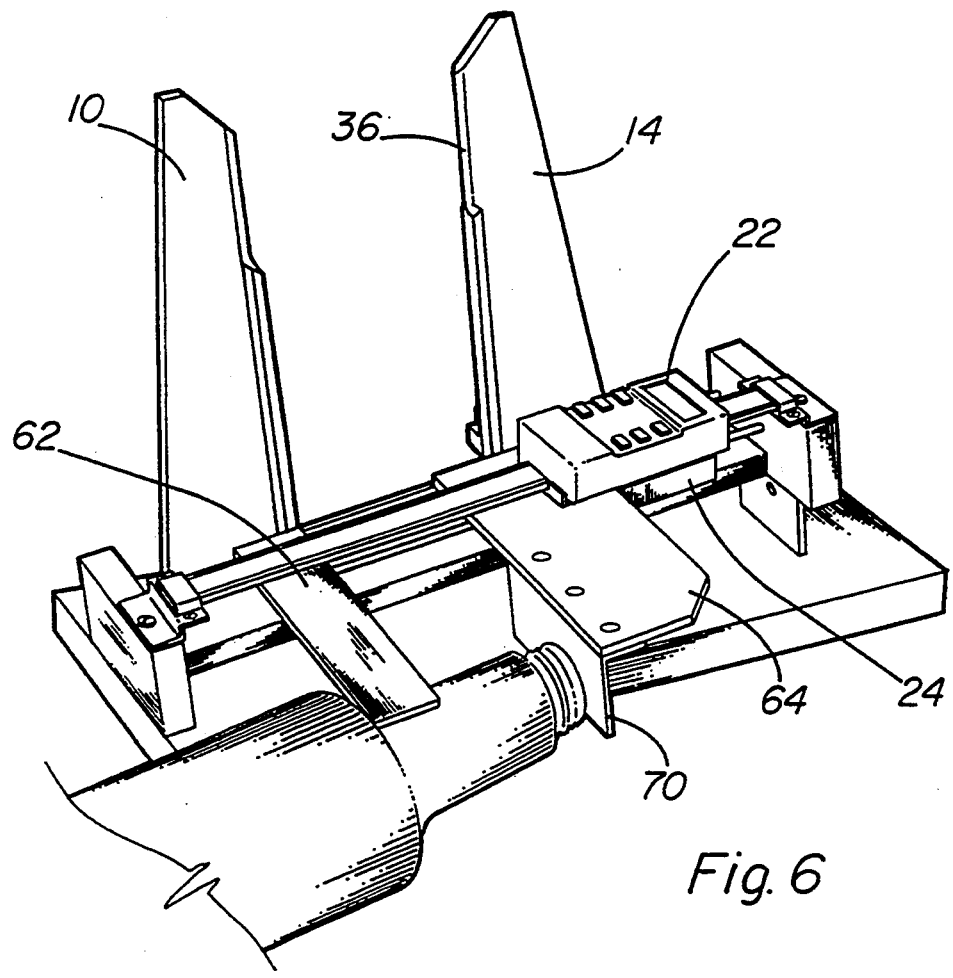
FIG. 6 is another perspective view of the caliper according to the present invention showing height measurement of a bottle neck.

FIG. 5 illustrates the same calliper construction as in the other figures, however the tension holding jaw 14 against jaw 10 is provided here by spring 60, which could also be replaced by any other suitable resilient means. This spring is attached by one end to end A and by the other to platform 24 carrying jaw 14 and provides a predetermined force to hold jaw 14 against jaw 10 in the closed position of the caliper, and against which the object to be measured will act when pushed into the V-grooved recess at the top of the jaws as shown by the arrow. In this embodiment, there is no need to incline the calliper as, for example, shown in FIG. 3, however a combination of gravity and spring action could also be employed, if desired.

The caliper of the present invention can also be provided with optional means to measure, for example, the length of the bottle's neck as shown in FIG. 6, which would not otherwise be readily measurable by jaws 10, 14 of the caliper itself. In view of the fact that these means are optional, they are shown in dotted lines in FIGS. 3, 4 and 5. They consist of a stationary plate 62 connected to the stationary jaw 10 and extending sideways therefrom beyond the edge of elongated base 12 and being parallel to said base 12. Another movable plate 64 is similarly connected to the base of the movable jaw 14 at a slightly lower level than plate 62 so that a portion of plate 64 overlaps plate 62 by sliding thereunder. The outer edge 66 of plate 62 is aligned with the inner edge 68 of plate 64. At the inner edge 68 of plate 64 there is also provided a downward projection 70 to facilitate abutment of the object to be measured against it as shown in FIG. 6. Plate 64 is thereby pushed by said object away from edge 66 of plate 62 and the distance by which it is so pushed is again recorded by unit 22 which is also displaced on strip 38 by the same distance, and the measurement is displayed in display window 40. This provides the calliper of the present invention with an important additional capability.

The above description of the invention describes preferred embodiments which are by no means limitative. Various modifications obvious to those skilled in the art can be made without departing from the spirit of the present invention and the scope of the following claims.

What is claimed is:

1. A caliper having an elongated base capable of being inclined relative to a horizontal surface; a stationary jaw at one end of said base projecting upwardly therefrom and having an inner edge against which an object to be measured will abut and which is perpendicular to the base; a movable jaw also projecting upwardly from the base and having a measuring edge also perpendicular to said base and normally positioned against the inner edge of the stationary jaw; said movable jaw being movable under a predetermined tension, along said base, away from said stationary jaw when the object to be measured is inserted between said jaws and the tension under which the movable jaw is moved away from the stationary jaw, when the object to be measured is inserted between said jaws, being provided by gravity by raising one end of the elongated base, which is opposite to the end where the stationary jaw is located, to such a level that the movable jaw will slide by gravity toward the stationary jaw on sliding means provided for this purpose; the upper ends of said jaws forming a generally V-shaped recess when the jaws rest against each other to permit insertion of the object to be measured between the edges of said jaws by pushing said object into said recess; and an electronic measuring unit mounted to move with the movable jaw and to accurately measure the distance between the inner edge of the stationary jaw and the measuring edge of the movable jaw and having means to display such measurements.

2. A caliper according to claim 1 wherein the sliding means comprise at least one ball bearing housing mounted on at least one rod for sliding movement along said rod.

3. A caliper according to claim 1, wherein the level to which said one end of the elongated base is raised is such as to provide just enough force to achieve sliding of the movable jaw by gravity.

4. A caliper according to claim 1, wherein the level to which said one end of the elongated base is raised is such as to have an incline at an angle of between 15° and 30°.

5. A caliper according to claim 1, wherein a portion of the inner edge of the stationary jaw and a corresponding portion of the measuring edge of the movable jaw are beveled.

6. A caliper according to claim 5, wherein said beveled portion of the edges of the jaws is the upper portion thereof.

7. A caliper according to claim 1, wherein the electronic measuring unit is a digimatic scale unit with digital display means, said unit being mounted on a flat strip for sliding movement thereon and being interconnected with the movable jaw so as to move in tandem therewith.

8. A caliper according to claim 7, wherein said measuring unit has an interface for connection to a computer, a printer or both.

9. A caliper according to claim 1, further comprising: a first plate connected to the stationary jaw and projecting sideways therefrom beyond a side edge of the elongated base, said first plate being stationary, perpendicular to the stationary jaw and parallel to the surface of the elongated base and having a straight outer edge; and a second plate connected to move with the movable jaw and projecting sideways in the same direction as the first plate and also extending beyond the side edge of the elongated base, said second plate being parallel and in proximity to the first plate and having a straight inner edge; said two plates being so positioned with respect to each other as to provide length measurement of an object abutting against the inner edge of the second plate and pushing it away from the outer edge of the first plate by the distance to be measured.

10. A caliper according to claim 9, wherein the second plate has a section overlapping with the first plate so that the inner edge thereof is aligned with the outer edge of the first plate.

11. A caliper according to claim 10, wherein the overlapping section of the second plate is positioned under the first plate.

12. A caliper according to claim 10, wherein there is provided at the inner edge of the second plate a substantially perpendicular projection to facilitate abutment of the object to be measured.

* * * * *